(12) United States Patent
Akiyoshi et al.

(10) Patent No.: US 9,960,627 B2
(45) Date of Patent: May 1, 2018

(54) FEED UNIT, FEED SYSTEM, AND ELECTRONIC DEVICE

(71) Applicant: Sony Corporation, Tokyo (JP)

(72) Inventors: Koichi Akiyoshi, Chiba (JP); Yoichi Uramoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 260 days.

(21) Appl. No.: 14/357,915

(22) PCT Filed: Dec. 11, 2012

(86) PCT No.: PCT/JP2012/082009
§ 371 (c)(1),
(2) Date: May 13, 2014

(87) PCT Pub. No.: WO2013/094464
PCT Pub. Date: Jun. 27, 2013

(65) Prior Publication Data
US 2014/0306650 A1 Oct. 16, 2014

(30) Foreign Application Priority Data

Dec. 21, 2011 (JP) .................................. 2011-279239
Apr. 18, 2012 (JP) .................................. 2012-094334

(51) Int. Cl.
*H02J 7/00* (2006.01)
*H02J 7/02* (2016.01)
(Continued)

(52) U.S. Cl.
CPC ............. *H02J 7/025* (2013.01); *H01M 10/44* (2013.01); *H02J 7/007* (2013.01); *H02J 7/0068* (2013.01);
(Continued)

(58) Field of Classification Search
CPC ............. H02J 5/005; H02J 7/025; H02J 50/80
(Continued)

(56) References Cited

U.S. PATENT DOCUMENTS

| 2010/0171461 A1 | 7/2010 | Baarman et al. |
| 2011/0193688 A1* | 8/2011 | Forsell ................. A61N 1/3787 |
| | | 340/10.4 |

(Continued)

FOREIGN PATENT DOCUMENTS

| CN | 102257701 A | 11/2011 |
| JP | 2001-102974 A | 4/2001 |

(Continued)

OTHER PUBLICATIONS

International Search Report dated Feb. 12, 2013 in PCT/JP2012/082009.

(Continued)

*Primary Examiner* — Nathaniel Pelton
(74) *Attorney, Agent, or Firm* — Oblon, McClelland, Maier & Neustadt, L.L.P.

(57) ABSTRACT

A feed unit includes: a power transmission section configured to perform power transmission using a magnetic field or an electric field, to a device to be fed including a secondary battery; and a power-transmission control section configured to control power transmission operation in the power transmission section. In a charging period in which charging to the secondary battery is performed based on transmitted power in the power transmission, when the device to be fed including the secondary battery is activated, the power-transmission control section controls the power transmission operation, to increase the transmitted power.

14 Claims, 9 Drawing Sheets

(51) Int. Cl.
- *H02J 50/80* (2016.01)
- *H02J 50/12* (2016.01)
- *H01M 10/44* (2006.01)
- *H02J 7/04* (2006.01)
- *H04B 5/00* (2006.01)

(52) U.S. Cl.
CPC .............. *H02J 7/027* (2013.01); *H02J 7/045* (2013.01); *H02J 50/12* (2016.02); *H02J 50/80* (2016.02); *H02J 7/04* (2013.01); *H02J 2007/0096* (2013.01); *H04B 5/0037* (2013.01); *H04B 5/0075* (2013.01)

(58) Field of Classification Search
USPC ........................................................ 320/108
See application file for complete search history.

(56) References Cited

U.S. PATENT DOCUMENTS

| | | | | |
|---|---|---|---|---|
| 2011/0266880 | A1* | 11/2011 | Kim | H02J 7/025 307/104 |
| 2012/0169137 | A1* | 7/2012 | Lisi | H02J 5/005 307/104 |
| 2012/0313579 | A1* | 12/2012 | Matsumoto | H02J 7/025 320/108 |

FOREIGN PATENT DOCUMENTS

| | | |
|---|---|---|
| JP | 2002-34169 A | 1/2002 |
| JP | 2005-110399 A | 4/2005 |
| JP | 2008-206233 A | 9/2008 |
| JP | 2010-63245 A | 3/2010 |
| JP | 2011-211760 A | 10/2011 |
| JP | 2011-254184 A | 12/2011 |
| WO | WO 00/27531 A1 | 5/2000 |
| WO | WO 2010/080736 A1 | 7/2010 |

OTHER PUBLICATIONS

Combined Chinese Office Action and Search Report dated Oct. 10, 2015 in Patent Application No. 201280061817.9 (with English language translation).

Office Action dated Aug. 25, 2015 in Japanese Patent Application No. 2012-094334 (with English language translation).

\* cited by examiner

[ FIG. 1 ]
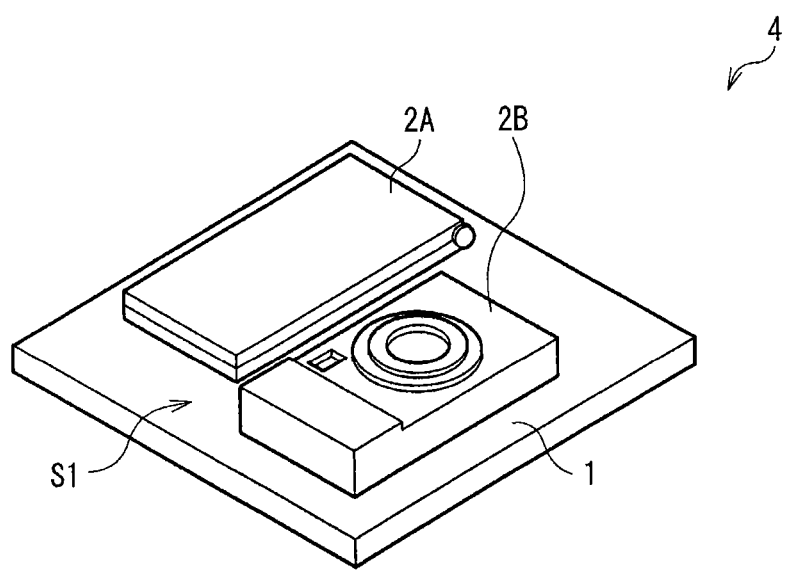

[FIG. 2]
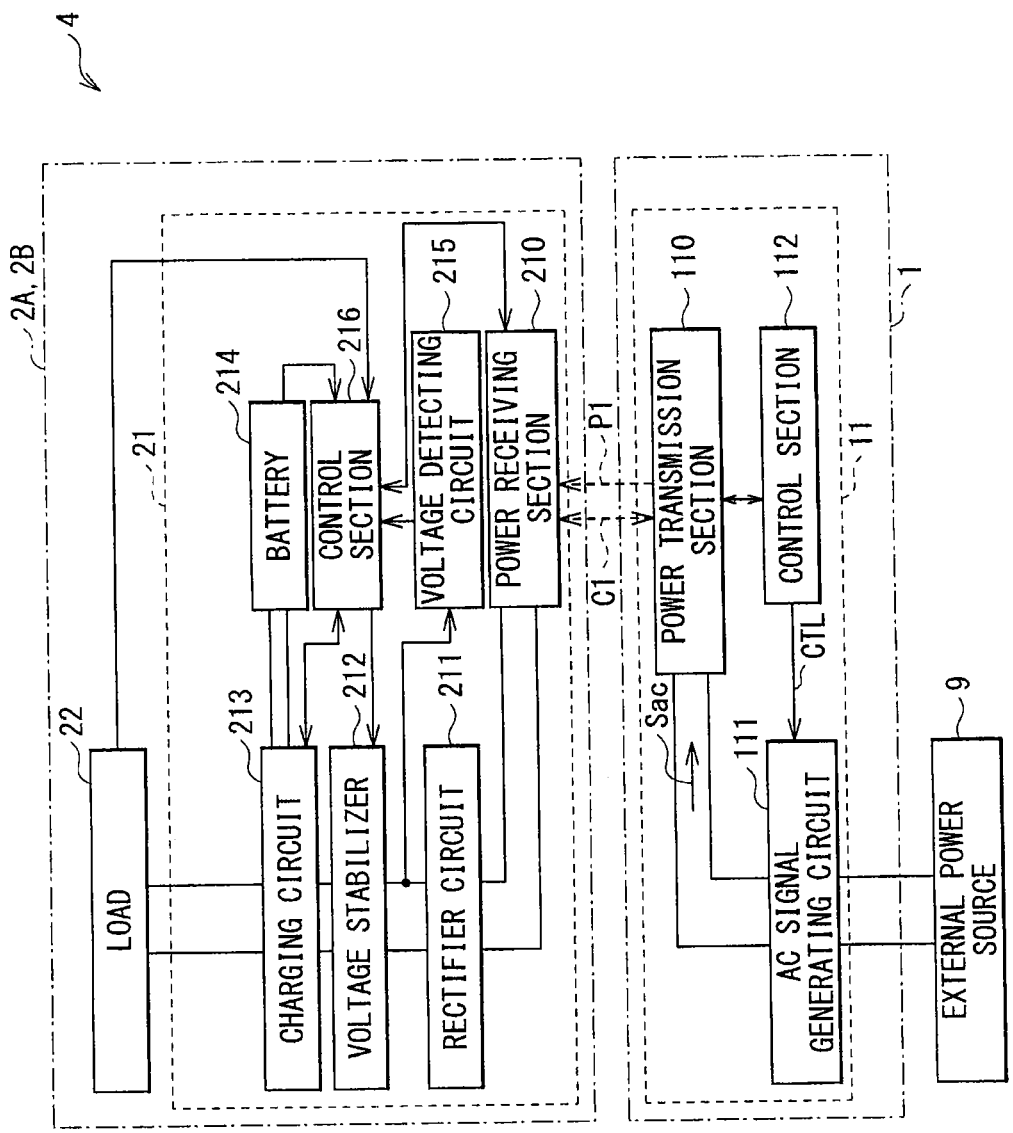

[FIG. 3]
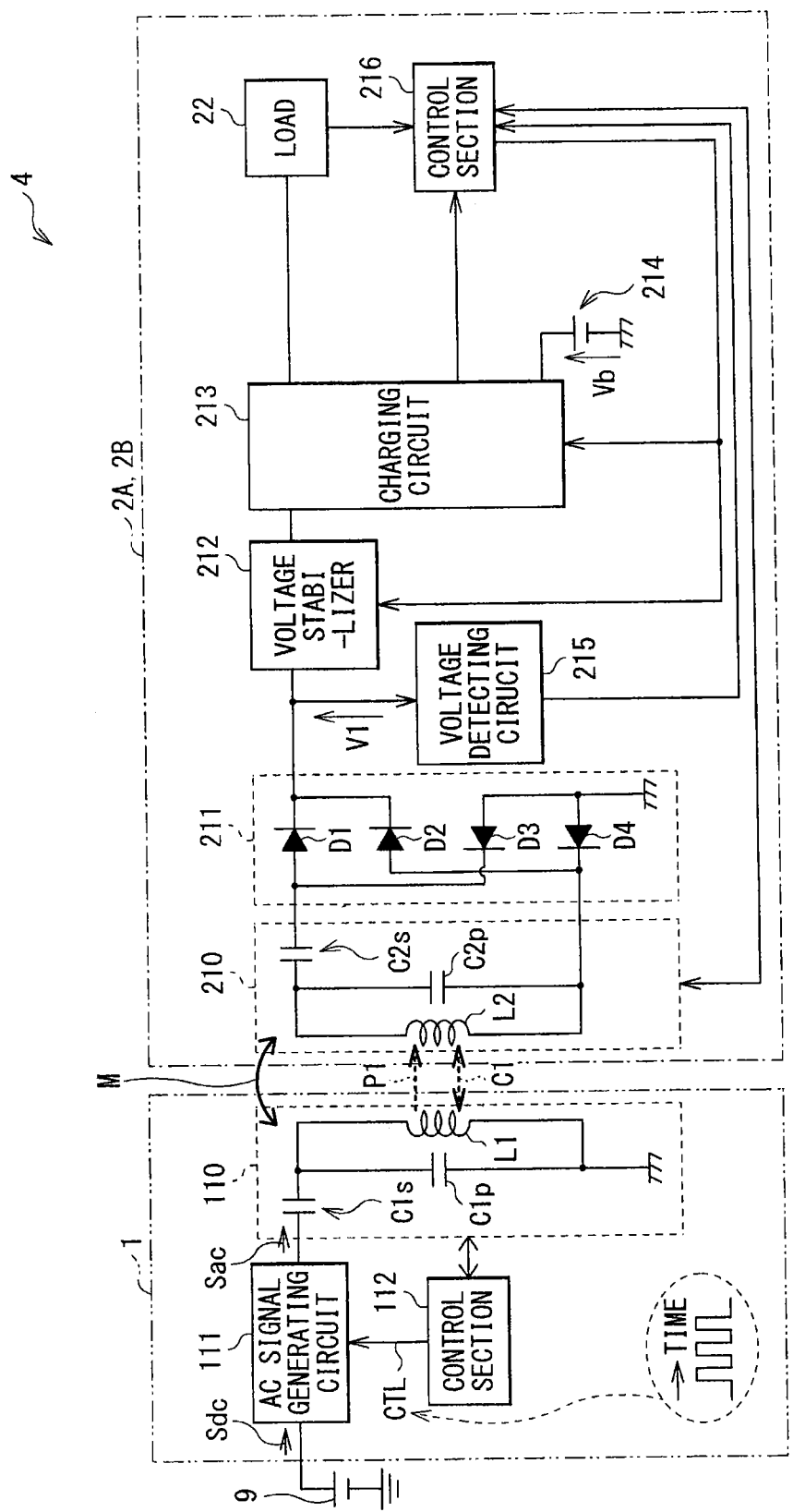

[ FIG. 4 ]
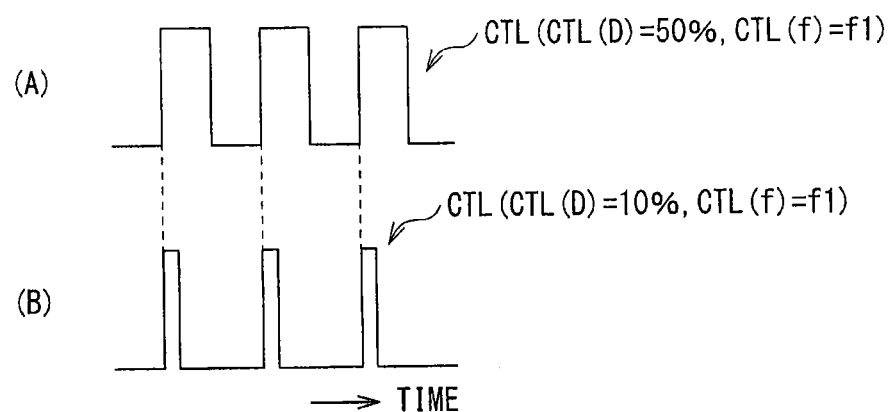
[ FIG. 5 ]
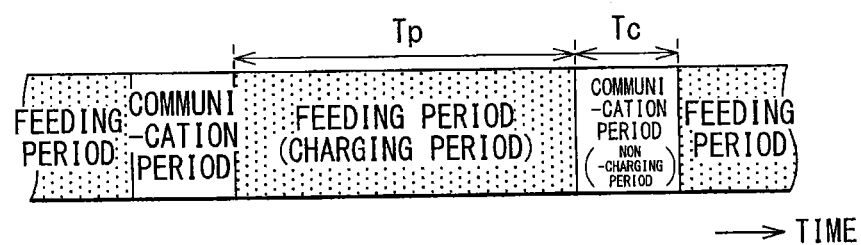

[ FIG. 6 ]
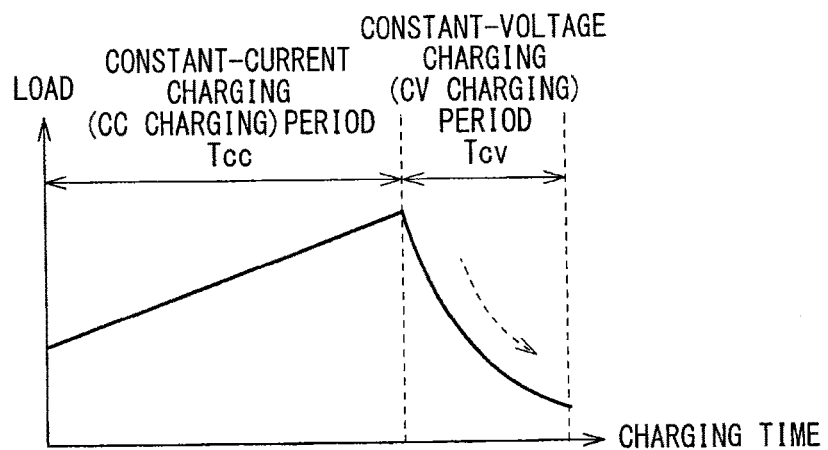
[ FIG. 7 ]
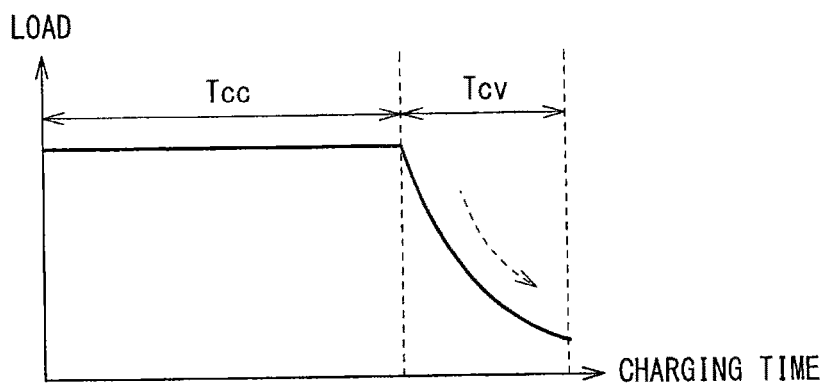

[FIG. 8]
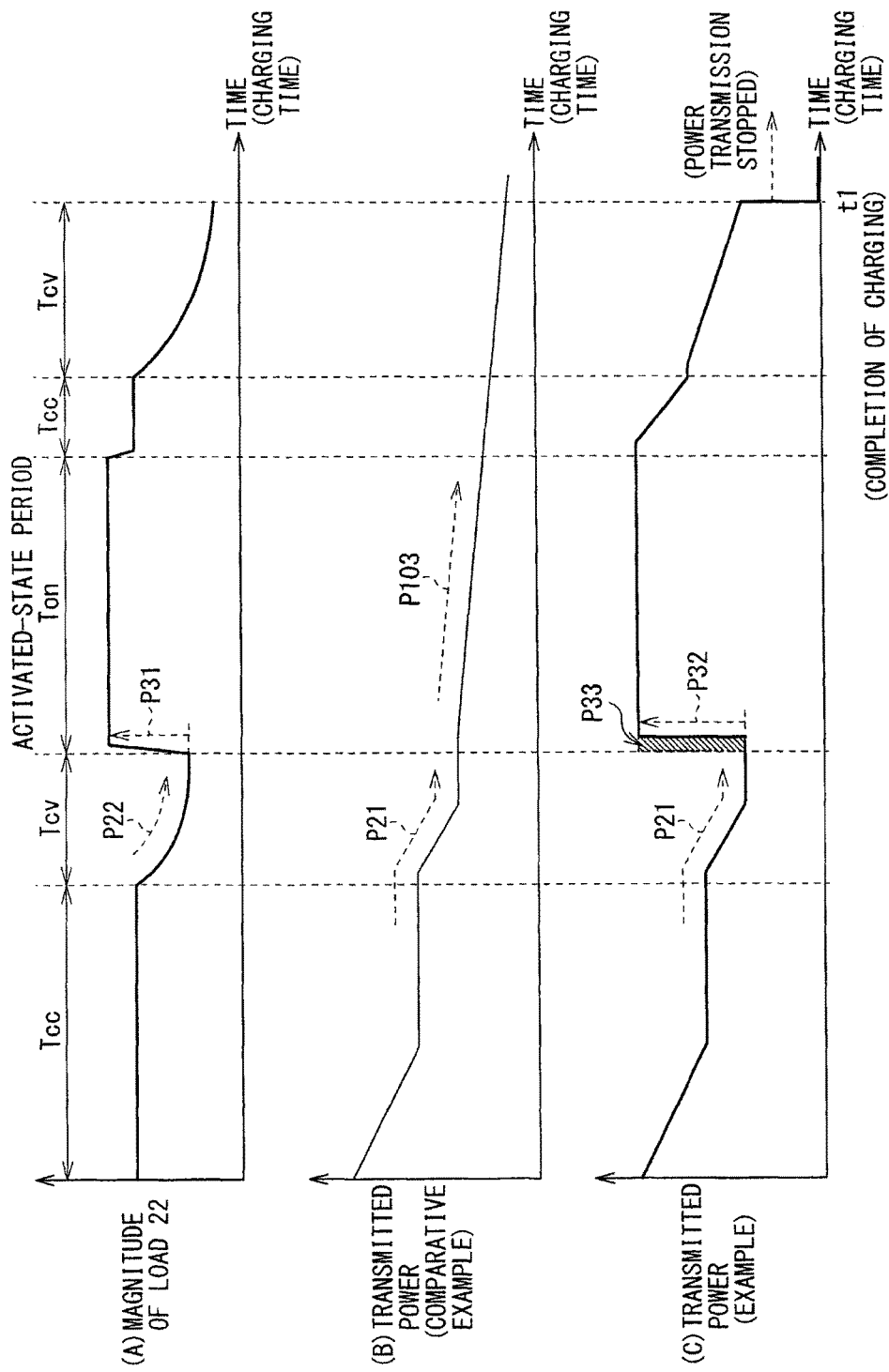

[ FIG. 9 ]
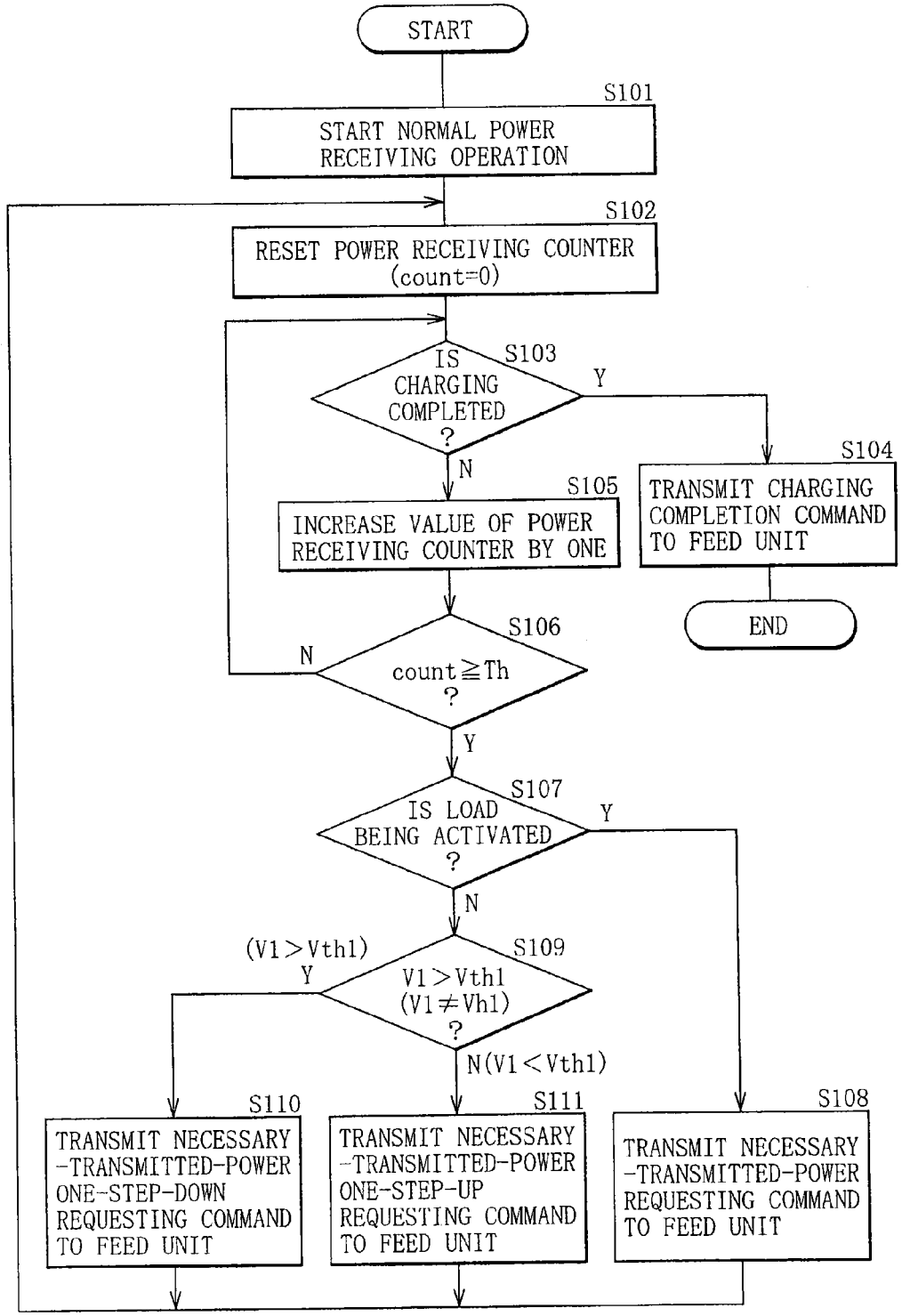

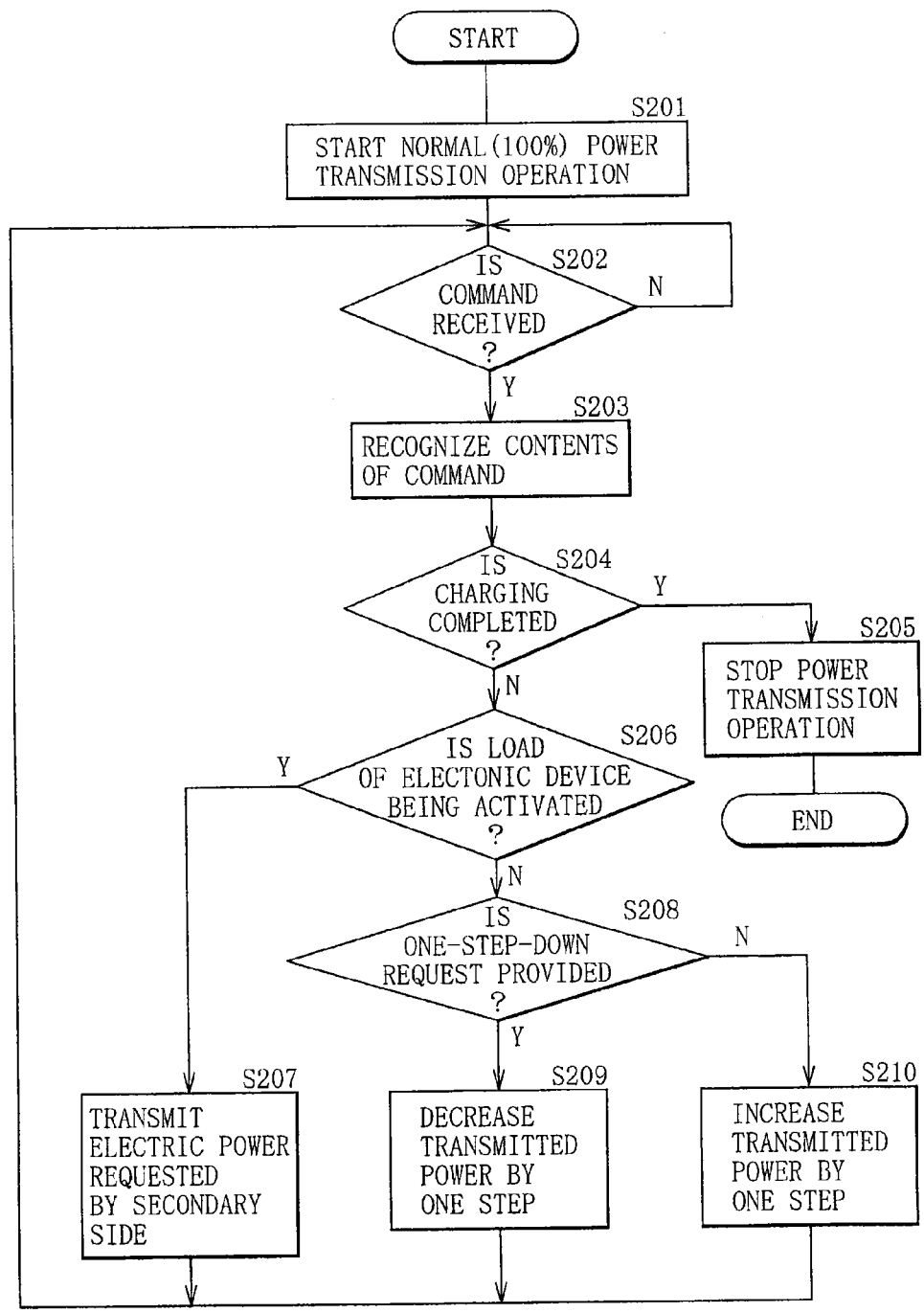
[ FIG. 10 ]

[ FIG. 11 ]
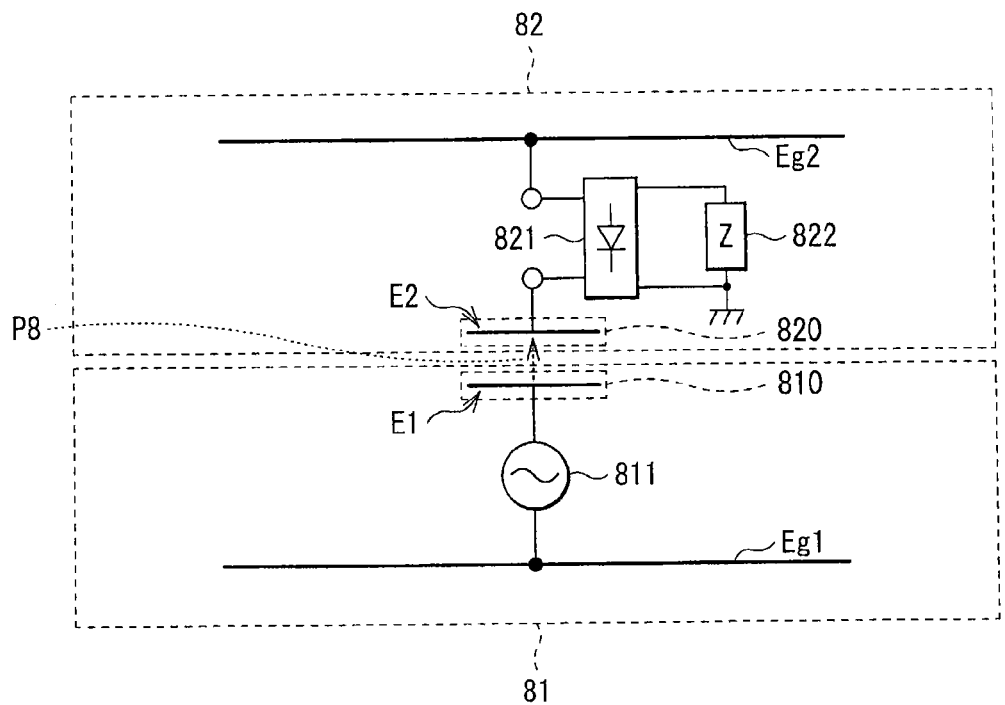
[ FIG. 12 ]
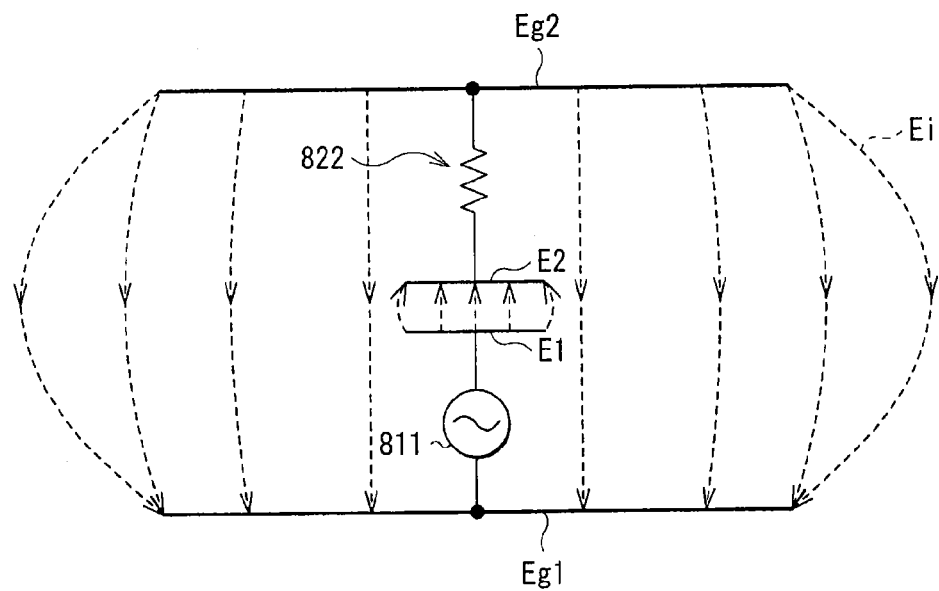

FEED UNIT, FEED SYSTEM, AND ELECTRONIC DEVICE

TECHNICAL FIELD

The present disclosure relates to a feed system that performs non-contact electric power supply (power transmission, electric power transmission) to a device to be fed such as an electronic device, as well as a feed unit and an electronic device applied to such a feed system.

BACKGROUND ART

In recent years, attention has been given to a feed system (a non-contact feed system, a wireless charging system) that performs non-contact electric power supply (power transmission, electric power transmission) to a CE device (Consumer Electronics Device) such as a mobile phone and a mobile music player. This makes it possible to start charging merely by placing an electronic device (a secondary-side device) on a charging tray (a primary-side device), instead of starting charging by inserting (connecting) a connector of a power-supply unit such as an AC adapter into the device. In other words, terminal connection between the electronic device and the charging tray becomes unnecessary.

As a method of thus performing non-contact electric power supply, an electromagnetic induction method is well known. In addition, in recent years, a non-contact feed system using a method called a magnetic resonance method utilizing an electromagnetic resonance phenomenon has also been receiving attention. Such non-contact feed systems are disclosed in, for example, Patent Literatures 1 to 6.

CITATION LIST

Patent Literature

Patent Literature 1: Japanese Unexamined Patent Application Publication No. 2001-102974
Patent Literature 2: WO 00/27531
Patent Literature 3: Japanese Unexamined Patent Application Publication No. 2008-206233
Patent Literature 4: Japanese Unexamined Patent Application Publication No. 2002-34169
Patent Literature 5: Japanese Unexamined Patent Application Publication No. 2005-110399
Patent Literature 6: Japanese Unexamined Patent Application Publication No. 2010-63245

SUMMARY OF THE INVENTION

Incidentally, in a non-contact feed system like those described above, in general, it is expected to improve convenience of a user, by appropriately controlling charging to a battery (a secondary battery) in a device to be fed such as an electronic device.

Accordingly, it is desirable to provide a feed unit, a feed system, and an electronic device that are capable of improving convenience of a user, when performing electric power transmission (power transmission) using a magnetic field or an electric field.

A feed unit according to an embodiment of the present disclosure includes: a power transmission section configured to perform power transmission using a magnetic field or an electric field, to a device to be fed including a secondary battery; and a power-transmission control section configured to control power transmission operation in this power transmission section. In a charging period in which charging to the secondary battery is performed based on transmitted power in the power transmission, when the device to be fed including the secondary battery is activated, the power-transmission control section controls the power transmission operation, to increase the transmitted power A first feed system according to an embodiment of the present disclosure includes: one or a plurality of electronic devices (devices to be fed) including a secondary battery; and the feed unit according to the above-described embodiment of the present disclosure. The feed unit is configured to perform electric power transmission using a magnetic field or an electric field, to this electronic device.

In the feed unit and the first feed system according to the above-described embodiments of the present disclosure, in the charging period in which the charging to the secondary battery in the device to be fed is performed based on the transmitted power in the power transmission using the magnetic field or the electric field, when the device to be fed including the secondary battery is activated, the power transmission operation is controlled to increase the transmitted power. Therefore, for example, even if the transmitted power is reduced and suppressed to be low in the charging period, the device to be fed may be allowed to secure electric power necessary for activation of its own, easily from the transmitted power.

An electronic device according to an embodiment of the present disclosure includes: a power receiving section configured to receive transmitted power in power transmission using a magnetic field or an electric field, from a feed unit; a secondary battery configured to be charged based on the transmitted power received by this power receiving section; and a control section configured to perform predetermined control. In a charging period in which charging to the secondary battery is performed, when the electronic device is activated, the control section notifies the feed unit side of a request for an increase of the transmitted power.

A second feed system according to an embodiment of the present disclosure includes: one or a plurality of the electronic devices (devices to be fed) according to the above-described embodiment; and a feed unit configured to perform power transmission using a magnetic field or an electric field, to this electronic device.

In the electronic device and the second feed system according to the above-described embodiments of the present disclosure, in the charging period in which the charging to the secondary battery is performed based on the transmitted power in the power transmission using the magnetic field or the electric field, when the electronic device is activated, the feed unit side is notified of the request for the increase of the transmitted power. Therefore, for example, even if the transmitted power is reduced and suppressed to be below in the charging period, the feed unit side is caused to increase the transmitted power, which may allow the electronic device to secure electric power necessary for activation of its own, easily from the transmitted power.

According to the electronic device and the first feed system according to the above-described embodiments of the present disclosure, in the charging period in which the charging to the secondary battery in the device to be fed is performed based on the transmitted power in the power transmission using the magnetic field or the electric field, the transmitted power is increased when the device to be fed including the secondary battery is activated. Therefore, even if the transmitted power is reduced and suppressed to be low in the charging period, the device to be fed may be allowed to secure the electric power necessary for the activation of its own, easily from the transmitted power. Hence, when the electric power transmission is performed using the magnetic field or the electric field, convenience of a user is allowed to be improved.

According to the electronic device and the second feed system according to the above-described embodiments of the present disclosure, in the charging period in which the charging to the secondary battery is performed based on the transmitted power in the power transmission using the magnetic field or the electric field, the feed unit side is notified of the request for the increase of the transmitted power, when the electronic device is activated. Therefore, even if the transmitted power is reduced and suppressed to be below in the charging period, the electronic device is allowed to secure the electric power necessary for the activation of its own, easily from the transmitted power. Hence, when the electric power transmission is performed using the magnetic field or the electric field, convenience of a user is allowed to be improved.

BRIEF DESCRIPTION OF DRAWINGS

FIG. 1 is a perspective view illustrating an appearance configuration example of a feed system according to an embodiment of the present disclosure.

FIG. 2 is a block diagram illustrating a detailed configuration example of the feed system illustrated in FIG. 1.

FIG. 3 is a circuit diagram illustrating a detailed configuration example of each block illustrated in FIG. 2.

FIG. 4 is a timing waveform diagram illustrating an example of a control signal for an alternating-current signal generating circuit.

FIG. 5 is a timing chart illustrating an example of each of a feeding period and a communication period.

FIG. 6 is a schematic diagram illustrating a load characteristic example of a battery in the feed system illustrated in FIG. 3.

FIG. 7 is a schematic diagram illustrating a load characteristic example of a charging circuit in the feed system illustrated in FIG. 3.

FIG. 8 is a timing chart illustrating an operation example in a feed system according to each of an example and a comparative example.

FIG. 9 is a flowchart illustrating a control example in an electronic device according to the example.

FIG. 10 is a flowchart illustrating a power transmission control example in a feed unit according to the example.

FIG. 11 is a block diagram illustrating a schematic configuration example of a feed system according to a modification.

FIG. 12 is a schematic diagram illustrating a propagation mode example of an electric field in the feed system illustrated in FIG. 11.

MODES FOR CARRYING OUT THE INVENTION

An embodiment of the present disclosure will be described below in detail with reference to the drawings. It is to be noted that the description will be provided in the following order.
1. Embodiment (an example in which transmitted power is increased when a device to be fed is activated in a charging period)
2. Modifications (such as an example of a feed system performing non-contact electric power transmission by using an electric field)

Embodiment

[Overall Configuration of Feed System 4]

FIG. 1 illustrates an appearance configuration example of a feed system (a feed system 4) according to an embodiment of the present disclosure, and FIG. 2 illustrates a block configuration example of this feed system 4. The feed system 4 is a system (a non-contact type feed system) that performs electric power transmission (power supply, feeding, power transmission) in a non-contact manner by using a magnetic field (by utilizing magnetic resonance, electromagnetic induction, or the like; likewise hereinafter). This feed system 4 includes a feed unit 1 (a primary-side device) and one or a plurality of electronic devices (here, two electronic devices 2A and 2B; secondary-side devices) each serving as a device to be fed.

In this feed system 4, electric power transmission from the feed unit 1 to the electronic devices 2A and 2B may be performed by placing the electronic devices 2A and 2B on (or, in proximity to) a feeding surface (a power transmission surface) S1 in the feed unit 1, as illustrated in FIG. 1, for example. Here, in consideration of a case in which the electric power transmission to the electronic devices 2A and 2B is performed simultaneously or time-divisionally (sequentially), the feed unit 1 is shaped like a mat (a tray) in which the area of the feeding surface S1 is larger than the electronic devices 2A and 2B to be fed and the like.

(Feed Unit 1)

The feed unit 1 is a unit (a charging tray) that performs the electric power transmission (power transmission) to the electronic devices 2A and 2B by using a magnetic field as described above. This feed unit 1 may include, for example, a power transmission unit 11 that includes a power transmission section 110, an alternating-current (AC) signal generating circuit (a high-frequency power generating circuit) 111, and a control section (a power-transmission control section) 112, as illustrated in FIG. 2.

The power transmission section 110 is configured to include a power transmission coil (a primary-side coil) L1 as well as capacitors (resonance capacitors) $C1p$ and $C1s$, which will be described later, and the like. The power transmission section 110 performs electric power transmission (power transmission) using an alternating field to each of the electronic devices 2A and 2B (specifically, a power receiving section 210 to be described later), by utilizing the power transmission coil L1 as well as the capacitors $C1p$ and $C1s$ (see an arrow P1 in FIG. 2). Specifically, the power transmission section 110 has a function of emitting a magnetic field (a magnetic flux) from the feeding surface S1 towards the electronic devices 2A and 2B. This power transmission section 110 also has a function of performing predetermined mutual communication operation with the power receiving section 210 to be described later (see an arrow C1 in FIG. 2).

The AC signal generating circuit 111 may be, for example, a circuit that generates a predetermined AC signal Sac (high-frequency electric power) intended to perform power transmission, by using electric power supplied from an external power source 9 (a host power source) of the feed unit 1. The AC signal generating circuit 111 as described above may be configured using, for example, a switching amplifier to be described later. It is to be noted that examples of the external power source 9 may include a USB (Universal Serial Bus) 2.0 power source (power supply ability: 500 mA, and power supply voltage: about 5 V) provided in a PC (Personal Computer) etc.

The control section 112 performs various kinds of control operation in the entire feed unit 1 (the entire feed system 4). Specifically, other than controlling the power transmission (power transmission operation) and the communication (communication operation) performed by the power transmission section 110, the control section 112 may have, for example, a function of controlling optimization of transmitted power and authenticating the secondary-side device. The control section 112 may further have a function of determining that the secondary-side device is on the primary-side device, and a function of detecting a mixture such as dissimilar metal. Here, when the above-described power transmission control is performed, operation of the AC signal generating circuit 111 is controlled using a predetermined control signal CTL to be described later. In addition, this control section 112 also has a function of performing modulation processing based on pulse width modulation (PWM) to be described later, by using the control signal CTL.

Further, the control section 112 has a function of performing a stepwise reduction of the transmitted power to a minimum power value necessary in charging, in a period in which each of the electronic devices 2A and 2B is not being activated, during a charging period in which a battery 214 to be described later in each of the electronic devices 2A and 2B is charged based on the transmitted power using a magnetic field. In addition, in such a charging period, the power transmission operation of the power transmission section 110 is controlled to increase the transmitted power, when the electronic devices 2A and 2B are activated. It is to be noted that, by utilizing communication to be described later with the electronic devices 2A and 2B, the control section 112 detects whether each of the electronic devices 2A and 2B is in the above-described charging period for the battery 214, and whether each of the electronic devices 2A and 2B is being activated. Such power transmission control (feeding control) by the control section 112 will be described in detail later (FIGS. 8 and 10).

(Electronic Devices 2A and 2B)

The electronic devices 2A and 2B each may be, for example, any of stationary electronic devices represented by television receivers, mobile electronic devices containing a rechargeable battery (a battery) represented by mobile phones and digital cameras, and the like. As illustrated in, for example, FIG. 2, the electronic devices 2A and 2B may each include a power receiving unit 21, and a load 22 that performs predetermined operation (operation that allows functions of serving as the electronic device to be performed) based on electric power supplied from this power receiving unit 21. Further, the power receiving unit 21 includes the power receiving section 210, a rectifier circuit 211, a voltage stabilizer 212, a charging circuit 213 (a charging section), a battery 214 (a secondary battery), a voltage detecting circuit 215, and a control section 216.

The power receiving section 210 is configured to include a power receiving coil (a secondary-side coil) L2 and capacitors $C2p$ and $C2s$ (resonance capacitors), which will be described later, and the like. The power receiving section 210 has a function of receiving electric power (transmitted power) transmitted from the power transmission section 110 in the feed unit 1, by utilizing the power receiving coil L2 as well as the resonance capacitors $C2p$ and $C2s$, and the like. This power receiving section 210 also has a function of performing the above-described predetermined mutual communication operation with the power transmission section 110 (see the arrow C1 in FIG. 2).

The rectifier circuit 211 is a circuit that rectifies the transmitted power (AC power) supplied from the power receiving section 210, and generates DC power.

The voltage stabilizer 212 is a circuit that performs predetermined voltage stabilization operation, based on the DC power supplied from the rectifier circuit 211. Specifically, an input voltage (an input voltage V1 to be described later) obtained based on the transmitted power is stabilized, and an output voltage after the stabilization is supplied to the charging circuit 213.

The charging circuit 213 is a circuit used to perform charging to the battery 214, based on the DC power (the above-described output voltage) supplied from the voltage stabilizer 212 after the voltage stabilization.

The battery 214 stores electric power according to the charging by the charging circuit 213, and may be configured using, for example, a rechargeable battery (a secondary battery) such as a lithium ion battery.

The voltage detecting circuit 215 is a circuit that detects the DC voltage (the input voltage V1 to the voltage stabilizer 212) outputted from the rectifier circuit 215, and outputs a result of the detection to the control section 216. Such a voltage detecting circuit 215 may be configured using, for example, a resistor and the like.

The control section 216 performs various kinds of control operation in each of the entire electronic devices 2A and 2B (the entire feed system 4). Specifically, for example, the control section 216 may have a function of controlling the power receiving operation and the communication operation by the power receiving section 110, and also have a function of controlling operation of each of the voltage stabilizer 212, the charging circuit 213, and the like. It is to be noted that the functions of this control section 216 will be described in detail later.

[Detailed Configuration of Feed Unit 1 as Well as Electronic Devices 2A and 2B]

FIG. 3 illustrates a detailed configuration example of each block in the feed unit 1 as well as the electronic devices 2A and 2B illustrated in FIG. 2, in a circuit diagram.

(Power Transmission Section 110)

The power transmission section 110 includes the power transmission coil L1 provided to perform electric power transmission using a magnetic field (to generate a magnetic flux), and the capacitors $C1p$ and $C1s$ that form, together with this power transmission coil L1, an LC resonance circuit. The capacitor $C1s$ is electrically connected to the power transmission coil L1 in series. In other words, one end of the capacitor $C1s$ and one end of the power transmission coil L1 are connected to each other. Further, the other end of the capacitor $C1s$ and the other end of the power transmission coil L1 are connected to the capacitor $C1p$ in parallel. A connection end between the power transmission coil L1 and the capacitor $C1p$ is grounded.

The LC resonance circuit configured of the power transmission coil L1 as well as the capacitors $C1p$ and $C1s$, and an LC resonance circuit that will be described later and configured of the power receiving coil L2 as well as the capacitors $C2s$ and $C2p$, are magnetically coupled to each other. As a result, LC resonance operation is performed based on a resonance frequency that is substantially the same as the high-frequency electric power (the AC signal Sac) generated by the AC signal generating circuit 111 to be described below.

(AC Signal Generating Circuit 111)

The AC signal generating circuit 111 is configured using a switching amplifier (a so-called class E amplifier) including one transistor (not illustrated) serving as a switching element. The control signal CTL for power transmission is supplied from the control section 112 to the AC signal generating circuit 111. This control signal CTL is a pulse signal having a predetermined duty ratio, as illustrated in FIG. 3. Further, for example, as illustrated in Parts (A) and (B) of FIG. 4, the pulse width modulation to be described later may be performed, by controlling this duty ratio in the control signal CTL.

In the AC signal generating circuit 11, with such a configuration, the above-described transistor performs ON/OFF operation (switching operation based on a predetermined frequency and duty ratio), according to the control signal CTL for power transmission. In other words, the ON/OFF operation of the transistor serving as the switching element is controlled using the control signal CTL supplied from the control section 112. As a result, for example, the AC signal Sac (AC power) may be generated based on a DC signal Sdc inputted from the external power source 9 side, and the generated AC signal Sac may be supplied to the power transmission section 110.

(Power Receiving Section 210)

The power receiving section 210 includes the power receiving coil L2 provided to receive electric power (from a magnetic flux) transmitted from the power transmission section 110, and also includes the capacitors C2p and C2s that form, together with this power receiving coil L2, the LC resonance circuit. The capacitor C2p is electrically connected to the power receiving coil L2 in parallel, and the capacitor C2s is electrically connected to the power receiving coil L2 in series. In other words, one end of the capacitor C2s is connected to one end of the capacitor C2p and one end of the power receiving coil L2. Further, the other end of the capacitor C2s is connected to one input terminal in the rectifier circuit 211, and the other end of the power receiving coil L2 as well as the other end of the capacitor C2p are connected to the other input terminal in the rectifier circuit 211.

The LC resonance circuit configured of the power receiving coil L2 as well as the capacitors C2p and C2s, and the above-described LC resonance circuit configured of the power transmission coil L1 as well as the capacitors C1p and C1s are magnetically coupled to each other. As a result, the LC resonance operation is performed based on a resonance frequency that is substantially the same as the high-frequency electric power (the AC signal Sac) generated by the AC signal generating circuit 111.

(Rectifier Circuit 211)

Here, the rectifier circuit 211 is configured using four rectifier elements (diodes) D1 to D4. Specifically, an anode of the rectifier element D1 and a cathode of the rectifier element D3 are connected to the one input terminal in the rectifier circuit 211, and a cathode of the rectifier element D1 and a cathode of the rectifier element D2 are connected to an output terminal in the rectifier circuit 211. Further, an anode of the rectifier element D2 and a cathode of the rectifier element D4 are connected to the other input terminal in the rectifier circuit 211, and an anode of the rectifier element D3 and an anode of the rectifier element D4 are grounded. In the rectifier circuit 211, with such a configuration, the AC power supplied from the power receiving section 210 is rectified, and received electric power that is the DC power is supplied to the voltage stabilizer 212.

(Voltage Stabilizer 212)

The voltage stabilizer 212 is, as described above, a circuit that stabilizes the DC power (the input voltage V1) supplied from the rectifier circuit 211, and may be configured using, for example, a power circuit such as a switching regulator.

(Charging Circuit 213)

The charging circuit 213 is, as described above, a circuit that performs charging to the battery 214 based on the output voltage (the DC power) from the voltage stabilizer 212. Here, the charging circuit 213 is disposed between the voltage stabilizer 212 and the load 22.

(Voltage Detecting Circuit 215)

The voltage detecting circuit 215 is, as described above, a circuit that detects the input voltage V1 to the voltage stabilizer 212, and thereby detects to what extent unnecessary electric power (electric power that exceeds the minimum power value necessary in charging to the battery 214) to be described later has been received.

(Control Section 216)

The control section 216 performs various kinds of control operation in each of the entire electronic devices 2A and 2B (the entire feed system 4) as described above, and also has the following functions in the present embodiment in particular. Specifically, there is provided a function of first obtaining and grasping various pieces of device information in the device (the electronic device 2A or the electronic device 2B) of its own whenever necessary. Specifically, information (activation status information) indicating an activation status of the device (the load 22) of its own (itself) is obtained from the load 22. Further, information (input voltage information) indicating a magnitude of the above-described input voltage V1 is obtained from the voltage detecting circuit 215. Information (power-remaining-amount information: for example, a battery voltage Vb illustrated in FIG. 3) indicating a power remaining amount in the battery 214 is also obtained from the charging circuit 213.

The control section 216 has functions such as a function of notifying the feed unit 1 side (the control section 112) of a request for an increase of the transmitted power, upon determining that the device of its own is activated in the charging period for the battery 214, by utilizing these obtained pieces of device information. It is to be noted that such notifying the feed unit 1 side is performed utilizing communication using the power receiving section 210. Such control (power-transmission request control) by the control section 216 will be described in detail later (FIGS. 8 and 9).

Functions and Effects of Feed System 4

1. Summary of Overall Operation

In this feed system 4, based on the electric power supplied from the external power source 9, the predetermined high-frequency electric power (the AC signal Sac) used to perform the electric power transmission is supplied from the high-frequency power generating circuit 111 in the feed unit 1, to the power transmission coil L1 as well as the capacitors C1p and C1s (the LC resonance circuit) in the power transmission section 110. This causes the magnetic field (the magnetic flux) in the power transmission coil L1 in the power transmission section 110. At this moment, when the electronic devices 2A and 2B each serving as a device to be fed (a device to be charged) are placed on (or, in proximity to) the top surface (the feeding surface S1) of the feed unit 1, the power transmission coil L1 in the feed unit 1 and the power receiving coil L2 in each of the electronic devices 2A and 2B are in proximity to each other in the vicinity of the feeding surface S1.

In this way, when the power receiving coil L2 is placed in proximity to the power transmission coil L1 generating the magnetic field (the magnetic flux), an electromotive force is generated in the power receiving coil L2 by being induced by the magnetic flux generated by the power transmission coil L1. In other words, due to electromagnetic induction or magnetic resonance, the magnetic field is generated by forming interlinkage with each of the power transmission coil L1 and the power receiving coil L2. As a result, electric power transmission from the power transmission coil L1 side (a primary side, the feed unit 1 side, or the power transmission section 110 side) to the power receiving coil L2 side (a secondary side, the electronic devices 2A and 2B side, or the power receiving section 210 side) is performed (see the arrow P1 in FIGS. 2 and 3). At this moment, the power transmission coil L1 on the feed unit 1 side and the power receiving coil L2 on the electronic devices 2A and 2B side are magnetically coupled to each other by the electromagnetic induction or the like, so that the LC resonance operation is performed in the above-described LC resonance circuits.

Then, in each of the electronic devices 2A and 2B, the AC power received by the power receiving coil L2 is supplied to the rectifier circuit 211, the voltage stabilizer 212, and the charging circuit 213, and the following charging operation is performed. Specifically, after this AC power is converted into predetermined DC power by the rectifier circuit 211, and the voltage stabilization operation is performed by the voltage stabilizer 212, the charging to the battery 214 based on this DC power is performed by the charging circuit 213. In this way, in each of the electronic devices 2A and 2B, the charging operation based on the electric power received by the power receiving section 210 is performed.

In other words, in the present embodiment, at the time of charging the electronic devices 2A and 2B, terminal connection to an AC adapter or the like, for example, may be unnecessary, and it is possible to start the charging easily by merely placing the electronic devices 2A and 2B on (or in proximity to) the feeding surface S1 of the feed unit 1 (non-contact feeding is performed). This reduces burden on a user.

Further, as illustrated in, for example, FIG. 5, at the time of such feeding operation, a feeding period Tp (a charging period for the battery 214) and a communication period Tc (a non-charging period) are time-divisionally periodic (or aperiodic). In other words, the control section 112 and the control section 216 perform the control so that the feeding period Tp and the communication period Tc are set to be time-divisionally periodic (or aperiodic). Here, this communication period Tc is a period in which the predetermined mutual communication operation (communication operation for authentication between devices, feeding efficiency control, and the like) using the power transmission coil L1 and the power receiving coil L2 is performed between the primary-side device (the feed unit 1) and the secondary-side device (the electronic devices 2A and 2B) (see the arrow C1 in FIGS. 2 and 3). It is to be noted that a time ratio between the feeding period Tp and the communication period Tc at this moment may be, for example, about 9:1.

Here, in this communication period Tc, the communication operation using the pulse width modulation in the AC signal generating circuit 111 may be performed, for example. Specifically, the duty ratio of the control signal CTL in the communication period Tc is set based on predetermined modulation data, so that the communication based on the pulse width modulation is performed. It is to be noted that it is theoretically difficult to perform frequency modulation at the time of resonance operation in the power transmission section 110 and the power receiving section 210 described above. Therefore, such pulse width modulation is used to achieve communication operation easily.

2. About Transmitted Power in Charging Period

Further, in the feed system 4 of the present embodiment, in the period in which the charging to the battery 214 in each of the electronic devices 2A and 2B is performed (in the charging period, or a period before completion of charging) based on the transmitted power in the power transmission using the magnetic field in the manner described above, the transmitted power is reduced and suppressed to be low. In other words, in such a charging period, the control section 112 in the feed unit 1 controls the power transmission operation performed by the power transmission section 110, so that the transmitted power is reduced and suppressed to be low. One reason for this is as follows.

Specifically, at first, for example, as illustrated in FIGS. 6 and 7, when the battery 214 is configured of a secondary battery such as a lithium ion battery, charging to the secondary battery may be performed usually based on so-called "CC-CV charging". In other words, charging control is performed so that a constant-voltage charging (CV charging) period Tcv is set to follow a constant-current charging (CC charge) period Tcc. At the time of such CC-CV charging, a load characteristic (a relationship between charging time and a magnitude of a load) of the battery 214 may be, for example, as illustrated in FIG. 6, and a load characteristic of the charging circuit 213 may be, for example, as illustrated in FIG. 7. In other words, as indicated by an arrow of a broken line in each of FIGS. 6 and 7, as the charging to the battery 214 proceeds, a gap occurs between the transmitted power and the electric power necessary in charging, and an amount corresponding to the gap becomes "surplus power ((excessive (unnecessary) transmitted power)" if the gap is left as it is. Such surplus power eventually becomes "heat", which heats the feed unit 1 as well as the electronic devices 2A and 2B, and therefore is a problem.

For this reason, in the present embodiment, in the period in which each of the electronic devices 2A and 2B is not activated during the charging period for the battery 214, the control section 112 performs control for a stepwise reduction of the transmitted power to the minimum power value necessary in charging. Further, the control section 216 in each of the electronic devices 2A and 2B side notifies the feed unit 1 (the control section 112) side of a request for a stepwise reduction of the transmitted power to the minimum power value necessary in charging, in the period in which the device of its own is not activated during the charging period.

FIG. 8 illustrates an operation example in the charging period, in a timing chart, in which Part (A) illustrates the magnitude of the load 22, Part (B) illustrates transmitted power in a feed system according to a comparative example, and Part (C) illustrates transmitted power according to an example of the present embodiment.

In this operation example, as indicated by an arrow P21 in this figure, the control section 112 reduces the transmitted power stepwise, by decreasing (or increasing) the transmitted power one step at a time, in response to a request from each of the electronic devices 2A and 2B (the control section 216). One reason for this is as follows. Specifically, first, for example, when the load 22 is lightened as indicated by an arrow P22 in this figure, a voltage such as the above-described input voltage V1 to the voltage stabilizer 212 may rise. Therefore, a minimum voltage value (a threshold voltage Vth1 to be described later; a magnitude of the input voltage V1, which ensures operation of the voltage stabilizer 212 (for example, the switching regulator)) in this input voltage V1 is defined, and the transmitted power is gradually reduced (one step at a time) to the extent not to fall below this minimum voltage value.

Specifically, as will be described in detail later, when the transmitted power is larger than the minimum power value necessary in charging (corresponding to the above-described threshold voltage Vth1), the control section 216 notifies a request for a decrease of the transmitted power by one step. On the other hand, when the transmitted power is smaller than the minimum power value (the threshold voltage Vth1), the control section 216 notifies a request for an increase of the transmitted power by one step. Subsequently, in response to such a request for the increase or decrease of the transmitted power, the control section 112 actually increases or decreases the transmitted power, one step a time. Such control of the transmitted power prevents useless (unnecessary) power transmission (charging) to the electronic devices 2A and 2B, and avoids heat and the like due to the above-described surplus transmitted power. It is to be noted that the above-described "minimum power value necessary in charging" may be preferably defined by not only the magnitude of the input voltage V1 in the voltage stabilizer 212, but also a magnitude of the output voltage from this voltage stabilizer 212. This is to allow more reliable determination as to whether functions of the voltage stabilizer 212 are not stopped as will be described later.

2-1. Comparative Example

However, in a case in which the transmitted power is thus reduced while a light state of the load 22 continues, the following issue arises in a comparative example, when each of the electronic devices 2A and 2B (the load 22) is activated as indicated by an arrow P31 in this figure (such as automatic activation by a timer or the like, and manual activation by a user).

Specifically, first, the transmitted power at that time may be significantly below maximum power necessary for the load 22. At the time of such an overload, although electric power is necessary for the charging circuit 213, the voltage stabilizer 212 (for example, the switching regulator) with the reduced transmitted power is not allowed to supply the charging circuit 213 with the electric power. Therefore, the charging circuit 213 supplies the load 22 with electric power, by utilizing a part of the charging power accumulated in the battery 214. In such a state, the input voltage V1 to the voltage stabilizer 212 suddenly drops, and the voltage stabilizer 212 enters a so-called UVLO (Under Voltage Lock Out) mode. In other words, the voltage stabilizer 212 configured of the switching regulator or the like stops the functions thereof, and does not supply the electric power to the charging circuit 213.

In such a UVLO mode, the load 22 being activated is supplied with the part of the charging power from the charging circuit 213 as described above, and therefore operates smoothly. On the other hand, the voltage stabilizer 212 in the UVLO mode is an electrically very light load. As a result, in an activated period (an activated-state period Ton) of the load 22, as indicated by an arrow P103 in the figure, the transmitted power is steadily reduced, because the voltage stabilizer 212 is a very light load even though the load 22 is in a heavy state.

In this way, in the comparative example illustrated in Part (B) of FIG. 8, although it is necessary to increase the transmitted power and there is sufficient transfer capability, the transmitted power is steadily reduced, and as a result, the amount of remaining power in the battery 214 continuously decreases, which impairs convenience of a user.

2-2. Present Embodiment

Therefore, in the feed system 4 of the present embodiment, when each of the electronic devices 2A and 2B is activated in the charging period for the battery 214, the control section 112 in the feed unit 1 controls the power transmission operation of the power transmission section 110 to increase the transmitted power (see an arrow P32 in Part (C) of FIG. 8). Further, the control section 216 in each of the electronic devices 2A and 2B side notifies the feed unit 1 side (the control section 112) of a request for an increase of the transmitted power, upon determining that the device (the load 22) of its own is activated in such a charging period.

At this moment, by utilizing the communication with the electronic devices 2A and 2B, the control section 112 detects whether each of the electronic devices 2A and 2B is in the charging period for the battery 214, and whether each of the electronic devices 2A and 2B (the load 22) is being activated. Further, the control section 216 notifies the feed unit 1 (the control section 112) side, by utilizing the communication with the feed unit 1. In the present embodiment, such control of the transmitted power results in the following, unlike the comparative example. Specifically, as described above, even if the transmitted power is reduced and suppressed to be low in the charging period, each of the electronic devices 2A and 2B readily secures electric power necessary for activation of its own, from the transmitted power.

It is to be noted that, in this process, as indicated by an arrow P33 and a diagonally shaded portion in Part (C) of FIG. 8, the control section 216 performs control so that activation operation of the load 22 is performed using a part of the charging power accumulated in the battery 214, in a period before the transmitted power actually increases in response to the request for the increase of the transmitted power. This is because this period corresponds to a time lag in the communication from the electronic devices 2A and 2B side to the feed unit 1 side, and in this period, it is necessary to perform the activation operation by receiving support from the charging power.

(Control Example in Electronic Devices 2A and 2B)

Here, FIG. 9 illustrates a specific control example of the control section 216 in each of the electronic devices 2A and 2B (a control example in the charging period), in a flowchart. In this control example, first, normal power receiving operation (operation of receiving 100% of the transmitted power) is performed in the power receiving section 210 (step S101).

Next, the control section 216 resets (initializes) a predetermined power receiving counter (Count=0: step S102). Subsequently, the control section 216 determines, by using the power-remaining-amount information serving as the above-described device information, whether a power remaining amount in the battery 214 is equal to or larger than a predetermined threshold, i.e., whether charging to the battery 214 is completed (step S103). Specifically, here, whether the battery voltage Vb is equal to or larger than a predetermined threshold voltage Vth is determined.

Here, upon determining that the battery voltage Vb is equal to or larger than the threshold voltage Vth (step S103: Y), the control section 216 determines that the charging to the battery 214 is completed, and notifies this result (transmits a charging completion command) to the feed unit 1 (the control section 112) side (step S104). This ends the control by the control section 216 in the charging period illustrated in FIG. 9. It is to be noted that this notification (the charging completion command) is performed utilizing the communication with the feed unit 1.

On the other hand, upon determining that the battery voltage Vb is smaller than the threshold voltage Vth (step S103: N), the control section 216 determines that the charging to the battery 214 is not yet completed), and increases the value of the power receiving counter by one (Count=Count+1: step S105). The control section 216 then determines whether this value of the power receiving counter is equal to or larger than a predetermined threshold Th (whether Count≥Th is satisfied) (step S106).

Here, when it is determined that the value of the power receiving counter is smaller than the threshold Th (Count<Th) (step S106: N), the flow returns to step S103 described above. On the other hand, upon determining that the value of the power receiving counter is equal to or larger than the threshold Th (Count≥Th) (step S106: Y), the control section 216 then determines, by using the above-described activation status information serving as the device information, whether the device (the load 22) of its own is being activated (step S107).

Here, upon determining that the load 22 is being activated (step S107: Y), the control section 216 notifies a request for an increase of the transmitted power (transmits a necessary-transmitted-power requesting command) to the feed unit 1 side (the control section 112) as described above (step S108). In other words, the control section 216 notifies the feed unit 1 side of a request, to bring the transmitted power to the power value necessary in activation. This notification (the necessary-transmitted-power requesting command) is also performed utilizing the communication with the feed unit 1. It is to be noted that the flow subsequently returns to step S102 described above.

On the other hand, upon determining that the load 22 is not being activated (step S107: N), the control section 216 then determines whether the input voltage V1 to the voltage stabilizer 212 is larger than or smaller than the threshold voltage Vth1 corresponding to the minimum power value necessary in charging (step S109). It is to be noted that, as described above, this threshold voltage Vth1 corresponds to the magnitude of the input voltage V1, the magnitude ensuring the operation of the voltage stabilizer 212 (for example, the switching regulator).

Here, when the input voltage V1 is larger than the threshold voltage Vth1 (V1>Vth1, step S109: Y), the control section 216 determines that the transmitted power is larger than the minimum power value necessary in charging, and notifies the feed unit 1 (the control section 112) side of a request for a decrease of the transmitted power by one step. In other words, the control section 216 transmits a necessary-transmitted-power one-step-down requesting command to the feed unit 1 side (step S110). This notification (the necessary-transmitted-power one-step-down requesting command) is also performed utilizing the communication with the feed unit 1. It is to be noted that the flow subsequently returns to step S102 described above.

On the other hand, when the input voltage V1 is smaller than the threshold voltage Vth1 (V1<Vth1, step S109: N), the control section 216 determines that the transmitted power is smaller than the minimum power value necessary in charging, and notifies the feed unit 1 (the control section 112) side of a request for an increase of the transmitted power by one step. In other words, the control section 216 transmits a necessary-transmitted-power one-step-up requesting command to the feed unit 1 side (step S111). This notification (the necessary-transmitted-power one-step-up requesting command) is also performed utilizing the communication with the feed unit 1. It is to be noted that the flow subsequently returns to step S102 described above.

In this way, in the charging period in which the charging to the battery 214 is performed based on the transmitted power, the request for an increase of the transmitted power is notified from each of the electronic devices 2A and 2B to the feed unit 1 side, when the device itself (the electronic device 2A or the electronic device 2B) is activated. This causes the feed unit 1 side to increase the transmitted power even if the transmitted power is reduced and suppressed to be below in the charging period as described above. Therefore, in each of the electronic devices 2A and 2B, this makes it easy to secure the electric power necessary for the activation of its own, from the transmitted power.

(Power Transmission Control Example in Feed Unit 1)

On the other hand, FIG. 10 illustrates a specific power transmission control example (a power transmission control example in the charging period) of the control section 112 in the feed unit 1, in a flowchart. In this power transmission control example, first, normal power transmission operation (operation of transmitting 100% of the transmitted power) is performed in the power transmission section 110 (step S201).

Next, the control section 112 determines whether a predetermined command from each of the electronic devices 2A and 2B (the control section 216) side is received (whether notification is provided for a predetermined request) (step S202). Here, when it is determined that the command is not received (step S202: N), step S202 is repeated.

On the other hand, upon determining that the command is received (step S202: Y), the control section 112 then recognizes contents of the command by decoding the contents (step S203). Subsequently, the control section 112 determines whether charging to the battery 214 is completed (whether the above-described charging completion command is received) (step S204).

Here, upon determining that the charging is completed (step S204: Y), the control section 112 then performs the power transmission control, to stop the power transmission operation by the power transmission section 110 (step S205). This prevents useless (unnecessary) power transmission (charging) to the electronic devices 2A and 2B, thereby avoiding heat and the like due to surplus transmitted power. The power transmission control by the control section 112 in the charging period illustrated in FIG. 10 is then completed.

On the other hand, upon determining that the charging is not yet completed (step S204: N), the control section 112 then determines, based on the contents (the above-described start status information) of the command, whether the electronic device (the load 22 in the electronic device 2A or the electronic device 2B) is being activated (step S206).

Here, upon determining that the electronic device (the load 22) is being activated (step S206: Y), the control section 112 then controls the transmitted power to bring the transmitted power to a power value necessary in activation, requested by the device side (requested in the necessary-transmitted-power requesting command described above). As a result, power transmission based on such a necessary power value is performed by the power transmission section 110 (step S207). It is to be noted that the flow subsequently returns to step S202 described above.

On the other hand, upon determining that the electronic device (the load 22) is not being activated (step S206: N), the control section 112 then determines, based on the contents of the command, whether a transmitted-power one-step-down request is provided (step S208). In other words, it is determined whether the necessary-transmitted-power one-step-down requesting command described above is received, or whether the necessary-transmitted-power one-step-up requesting command described above is received.

Here, upon determining that the transmitted-power one-step-down request is provided (the necessary-transmitted-power one-step-down requesting command is received) (step S208: Y), the control section 112 then controls the transmitted power to decrease the transmitted power by one step. As a result, power transmission based on the transmitted power decreased by one step is performed by the power transmission section 110 (step S209). It is to be noted that the flow subsequently returns to step S202 described above.

On the other hand, upon determining that the transmitted-power one-step-down request is not provided (the necessary-transmitted-power one-step-up requesting command is received) (step S208: N), the control section 112 controls the transmitted power to increase the transmitted power by one step. As a result, power transmission based on the transmitted power increased by one step is performed by the power transmission section 110 (step S210). It is to be noted that the flow subsequently returns to step S202 described above.

In this way, when the electronic device (the electronic device 2A or the electronic device 2B) having the battery 214 is activated in the charging period in which the charging to the battery 214 is performed based on the transmitted power, the power transmission operation is controlled to increase the transmitted power. This makes it easy in each of the electronic devices 2A and 2B to secure the electric power necessary for activation of its own from the transmitted power, even if the transmitted power is reduced and suppressed to be low in the charging period as described above.

As described above, in the present embodiment, when the electronic device (the electronic device 2A or the electronic device 2B) having the battery 214 is activated in the charging period in which the charging to the battery 214 is performed based on the transmitted power, the control section 112 controls the power transmission operation to increase the transmitted power. Further, the control section 216 notifies the feed unit 1 side of the request for the increase of the transmitted power, when the device (the electronic device 2A or the electronic device 2B) of its own is activated in such a charging period. This causes the feed unit 1 side to increase the transmitted power, even if the transmitted power is reduced and suppressed to be below in the charging period. Therefore, this makes it easy in each of the electronic devices 2A and 2B, to secure the electric power necessary for activation of its own from the transmitted power. Hence, it is possible to improve convenience of a user, when the electric power transmission using a magnetic field is performed.

It is to be noted that the transmitted power (including a combination with the charging power in the battery 214) exceeding maximum electric power necessary in activation of the load 22 is a condition for the control by each of the control sections 112 and 216 in the present embodiment. Therefore, when such an electric power balance is not satisfied, part of the functions in the load 22 may be preferably limited (invalidated) at the time of activating the load 22, and the like, according to the amount of remaining power in the battery 214. This is because, without such a limit (invalidation), the charging power in the battery 214 gradually decreases.

[Modifications]

Technology of the present disclosure has been described above with reference to the embodiment, but the present technology is not limited to this embodiment and may be variously modified.

For example, the description has been provided using various coils (the power transmission coil, and the power receiving coil) in the above-described embodiment, but various kinds of configurations may be used as the configurations (the shapes) of these coils. In other words, each coil may have, for example, a shape such as a spiral shape, a loop shape, a bar shape using a magnetic substance, an α-winding shape in which a spiral coil is folded to be in two layers, a spiral shape having more multiple layers, a helical shape in which a winding is wound in a thickness direction, etc. In addition, each coil may be not only a winding coil configured using a wire rod having conductivity, but also a pattern coil having conductivity and configured using, for example, a printed circuit board, a flexible printed circuit board, etc.

Further, in the above-described embodiment, an electronic device has been described as an example of the device to be fed, but the device to be fed is not limited thereto and may be any type of device to be fed other than electronic devices (for example a vehicle such as an electric car).

Furthermore, in the above-described embodiment, each component of the feed unit and the electronic device has been specifically described. However, it is not necessary to provide all the components, or other component may be further provided. For example, a communication function, a function of performing some kind of control, a display function, a function of authenticating a secondary-side device, a function of detecting a mixture such as dissimilar metal, and/or the like may be provided in the feed unit and/or the electronic device. Moreover, the power transmission control (the control of increasing the transmitted power, when the electronic device that is the device to be fed is activated in the charging period) in the above-described embodiment may be performed only under a predetermined condition, without being uniformly executed at the time of activating the electronic device. For example, in a case in which a predetermined sequence (operation) defined beforehand is performed, execution of the above-described power transmission control may be disabled, even when the electronic device is activated. In other words, the above-described power transmission control may be executed, for example, when the electronic device is activated in anything other than the above-described predetermined sequence, such as when a user activates the electronic device by pushing a power button of the electronic device.

In addition, the embodiment has been described above by taking mainly the case in which the plurality of (two or more) electronic devices are provided in the feed system, as an example. However, without being limited to this case, only one electronic device may be provided in the feed system.

Moreover, the embodiment has been described above by taking the charging tray for the small electronic device (the CE device) such as a mobile phone, as an example of the feed unit. However, the feed unit is not limited to such a home charging tray, and may be applicable to battery chargers of various kinds of electronic devices. In addition, it is not necessary for the feed unit to be a tray, and may be, for example, a stand for an electronic device such as a so-called cradle.

(Example of Feed System Performing Non-Contact Electric Power Transmission Using Electric Field)

Further, the above-described embodiment has been provided by taking, as an example, the case of the non-contact feed system that performs the non-contact electric power transmission (feeding) using a magnetic field, from the feed unit serving as the primary-side device to the electronic device serving as the secondary-side device, but this is not limitative. In other words, contents of the present disclosure are applicable also to a feed system that performs non-contact electric power transmission using an electric field (electric field coupling), from a feed unit serving as a primary-side device to an electronic device serving as a secondary-side device. In this case, it is possible to obtain effects similar to those of the above-described embodiment.

Specifically, for example, a feed system illustrated in FIG. 11 may include one feed unit 81 (a primary-side device) and one electronic device 82 (a secondary-side device). The feed unit 81 mainly includes a power transmission section 810, an AC signal source 811 (an oscillator), and an earth electrode Eg1. The power transmission section 810 includes a power transmission electrode E1 (a primary-side electrode). The electronic device 82 mainly includes a power receiving section 820, a rectifier circuit 821, a load 822, and an earth electrode Eg2. The power receiving section 820 includes a power receiving electrode E2 (a secondary-side electrode). To be more specific, this feed system includes two sets of electrodes, i.e., the power transmission electrode E1 and the power receiving electrode E2, as well as the earth electrode Eg1 and the earth electrode Eg2. In other words, the feed unit 81 (the primary-side device) and the electronic device 82 (the secondary-side device) each include, inside thereof, an antenna having a structure of an asymmetric pair of electrodes such as a monopole antenna.

In the feed system having such a configuration, when the power transmission electrode E1 and the power receiving electrode E2 face each other, the above-described non-contact antennas are coupled to each other (electric field coupling with respect to each other occurs along a vertical direction of the electrodes). Then, an induction field is generated therebetween, and electric power transmission using the electric field is performed (see electric power P8 illustrated in FIG. 11). Specifically, for example, as schematically illustrated in FIG. 12, the generated electric field (an induction field Ei) may propagate from the power transmission electrode E1 side towards the power receiving electrode E2 side, and the generated induction field Ei may propagate from the earth electrode Eg2 side towards the earth electrode Eg1 side. In other words, between the primary-side device and the secondary-side device, a loop path of the generated induction field Ei is formed. In such a non-contact electric power supply system using an electric field, by applying a technique similar to that of the above-described embodiment, it is possible to obtain similar effects.

It is to be noted that the present technology may also have the following configurations.

(1)
A feed unit including:
a power transmission section configured to perform power transmission using a magnetic field or an electric field, to a device to be fed including a secondary battery; and
a power-transmission control section configured to control power transmission operation in the power transmission section,
wherein, in a charging period in which charging to the secondary battery is performed based on transmitted power in the power transmission, when the device to be fed including the secondary battery is activated,
the power-transmission control section controls the power transmission operation, to increase the transmitted power.

(2)
The feed unit according to (1), wherein the power-transmission control section controls the transmitted power, to achieve a power value necessary in activation, requested by the device to be fed.

(3)
The feed unit according to (1) or (2), wherein
in a period in which the device to be fed is not activated during the charging period,
the power-transmission control section reduces the transmitted power stepwise, to a minimum power value necessary in the charging.

(4)
The feed unit according to (3), wherein, when reducing the transmitted power stepwise, the power-transmission control section decreases or increases the transmitted power one step at a time, in response to a request from the device to be fed.

(5)
The feed unit according to any one of (1) to (4), wherein the power-transmission control section stops the power transmission operation, upon completion of charging to the secondary battery.

(6)
The feed unit according to any one of (1) to (5), wherein the power-transmission control section detects, by utilizing communication with the device to be fed, whether the device to be fed is in the charging period, and whether the device to be fed is activated.

(7)
A feed system including:
one or a plurality of electronic devices including a secondary battery; and
a feed unit configured to perform power transmission using a magnetic field or an electric field, to the electronic device,
wherein the feed unit includes
a power transmission section configured to perform the power transmission, and
a power-transmission control section configured to control power transmission operation in the power transmission section, and
in a charging period in which charging to the secondary battery is performed based on transmitted power in the power transmission, when the electronic device including the secondary battery is activated,
the power-transmission control section controls the power transmission operation, to increase the transmitted power.

(8)
An electronic device including:
a power receiving section configured to receive transmitted power in power transmission using a magnetic field or an electric field, from a feed unit;
a secondary battery configured to be charged based on the transmitted power received by the power receiving section; and
a control section configured to perform predetermined control,
wherein, in a charging period in which charging to the secondary battery is performed, when the electronic device is activated, the control section notifies the feed unit side of a request for an increase of the transmitted power.

(9) The electronic device according to (8), wherein
in a period before the transmitted power actually increases in response to the request for the increase of the transmitted power,
the control section performs control to allow activation operation by using a part of charging power accumulated in the secondary battery.

(10) The electronic device according to (8) or (9), wherein,
in a period in which the electronic device is not activated during the charging period,
the control section notifies the feed unit side of a request for a stepwise reduction of the transmitted power to a minimum power value necessary in the charging.

(11) The electronic device according to (10), wherein,
the control section notifies a request for a decrease of the transmitted power by one step, when the transmitted power is larger than the minimum power value, and
the control section notifies a request for an increase of the transmitted power by one step, when the transmitted power is smaller than the minimum power value.

(12) The electronic device according to (10) or (11), further including:
a charging section configured to perform charging to the secondary battery; and
a voltage stabilizer configured to perform stabilization of an input voltage obtained based on the transmitted power, and to supply the charging section with an output voltage after the stabilization,
wherein the minimum power value is defined using a magnitude of each of the input voltage and the output voltage in the voltage stabilizer.

(13) The electronic device according to (12), wherein
the voltage stabilizer is configured using a switching regulator, and
the minimum power value corresponds to a magnitude of the input voltage, the magnitude ensuring operation of the switching regulator.

(14) The electronic device according to any one of (8) to (13), wherein the control section notifies the feed unit side of a request to bring the transmitted power to a power value necessary in activation.

(15) The electronic device according to any one of (8) to (14), wherein, upon completion of charging to the secondary battery, the control section notifies the feed unit side of the completion.

(16) The electronic device according to any one of (8) to (15), wherein the control section notifies the feed unit side, by utilizing communication with the feed unit.

(17) A feed system including:
one or a plurality of electronic devices; and
a feed unit configured to perform power transmission using a magnetic field or an electric field, to the electronic device,
wherein the electronic device includes
a power receiving section configured to receive transmitted power in the power transmission,
a secondary battery configured to be charged based on the transmitted power received by the power receiving section, and
a control section configured to perform predetermined control, and
when the electronic device is activated, in a charging period in which charging to the secondary battery is performed,
the control section notifies the feed unit side of a request for an increase of the transmitted power.

The present application claims priority based on Japanese Patent Application No. 2011-279239 filed in the Japan Patent Office on Dec. 21, 2011, and Japanese Patent Application No. 2012-94334 filed in the Japan Patent Office on Apr. 18, 2012, the entire contents of each of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A feed unit, comprising:
a power transmission coil configured to transmit power, via a magnetic field or an electric field, to a device including a secondary battery; and
a power-transmission control circuit configured to control power transmission operation of the power transmission coil, wherein
the power-transmission control circuit controls, when the device is in a charging period and the load of the device is activated, the power transmission coil to increase the power transmitted to the device by achieving a power value necessary in the activation of the load according to a request from the device, and
the power-transmission control circuit controls, when the device is in the charging period and the load of the device is not activated, to increase or decrease by one step the transmitted power based on whether or not the request indicates one step down.

2. The feed unit according to claim 1, wherein in a period in which the device is not activated during the charging period, the power-transmission control circuit controls the power transmission coil to reduce the transmitted power stepwise to a minimum power value necessary in the charging.

3. The feed unit according to claim 2, wherein when reducing the transmitted power stepwise, the power transmission coil decreases or increases the transmitted power one step at a time in response to the request from the device.

4. The feed unit according to claim 1, wherein the power-transmission control circuit controls the power transmission coil to stop the power transmission upon completion of charging to the secondary battery.

5. The feed unit according to claim 1, wherein the power-transmission control circuit detects, by utilizing communication with the device, whether the device is in the charging period, and whether the device is activated.

6. A feed system, comprising:
a device including a secondary battery; and
a feed unit configured to transmit power, via a magnetic field or an electric field, to the device, the feed unit including
a power transmission coil configured to transmit the power to the device, and a power-transmission control circuit configured to control power transmission operation of the power transmission coil, wherein the power-transmission control circuit controls, when the device is in a charging period and the load of the device is activated, the power transmission coil to increase the power transmitted to the device by achieving a power value necessary in the activation of the load according to a request from the device, and the power-transmission control circuit controls, when the device is in the charging period and the load of the device is not activated, to increase or decrease by one step the transmitted power based on whether or not the request indicates a one-step-down.

7. An electronic device, comprising:
a power receiving coil configured to receive power transmitted, via a magnetic field or an electric field, from a feed unit;
a secondary battery configured to store the power received by the power receiving coil; and
a control circuit configured to
control charging of the secondary battery, and
notify the feed unit, when a the electronic device is in a charging period and a load of the electronic device is either activated or not activated, of a request to adjust the power transmission, wherein
when the electronic device is in the charging period and the load of the electronic device is activated,
the feed unit increases the power transmitted to the power receiving coil by achieving a power value necessary in the activation of the load according to the request, and
when the electronic device is in the charging period and the load of the electronic device is not activated, the feed unit increases or decreases by one step the transmitted power based on whether or not the request indicates a one-step-down.

8. The electronic device according to claim 7, wherein the control circuit notifies the feed unit, in a period in which the electronic device is not activated during the charging period, to perform a stepwise reduction of the transmitted power to a minimum power value necessary in the charging.

9. The electronic device according to claim 8, wherein the control circuit notifies the feed unit to
decrease the transmitted power by one step when the transmitted power is larger than the minimum power value, and
increase the transmitted power by one step when the transmitted power is smaller than the minimum power value.

10. The electronic device according to claim 8, further comprising:
a charging circuit configured to charge the secondary battery; and
a voltage stabilizer configured to perform stabilization of an input voltage obtained based on the transmitted power, and to supply the charging circuit with an output voltage after the stabilization, wherein
the minimum power value is defined using a magnitude of each of the input voltage and the output voltage in the voltage stabilizer.

11. The electronic device according to claim 10, wherein
the voltage stabilizer is configured using a switching regulator, and
the minimum power value corresponds to a magnitude of the input voltage, the magnitude ensuring operation of the switching regulator.

12. The electronic device according to claim 7, wherein the control circuit notifies, upon completion of charging the secondary battery, the feed unit of the completion.

13. The electronic device according to claim 7, wherein the control circuit notifies the feed unit by communicating with the feed unit.

14. A feed system, comprising:
a device; and
a feed unit configured to transmit power, via a magnetic field or an electric field, to the device,
the device including
a power receiving coil configured to receive the power transmitted from the feed unit,
a secondary battery configured to store the power received by the power receiving coil, and
a control circuit configured to
control charging of the secondary battery, and
notify the feed unit, when the device is in a charging period and a load of the device is either activated or not activated, of a request to adjust the power transmission, wherein
the power transmitted by the feed unit, received by the power receiving coil, is increased when the request indicates that the device is in the charging period and the load of the device is activated,
the feed unit increases the power transmitted to the power receiving coil by achieving a power value necessary in the activation of the load according to the request, and
when the device is in the charging period and the load of the device is not activated, the feed unit increases or decreases by one step the transmitted power based on whether or not the request is a one-step-down.

* * * * *